United States Patent [19]
Liedtke

[11] Patent Number: 5,813,046
[45] Date of Patent: Sep. 22, 1998

[54] VIRTUALLY INDEXABLE CACHE MEMORY SUPPORTING SYNONYMS

[75] Inventor: Jochen Liedtke, Sankt Augustin, Germany

[73] Assignee: GMD—Forschungszentrum Informationstechnik GmbH, Germany

[21] Appl. No.: 637,708

[22] PCT Filed: Aug. 11, 1994

[86] PCT No.: PCT/EP94/03667

§ 371 Date: Jul. 31, 1996

§ 102(e) Date: Jul. 31, 1996

[87] PCT Pub. No.: WO95/13584

PCT Pub. Date: May 18, 1995

[30] Foreign Application Priority Data

Nov. 9, 1993 [DE] Germany ............................ 43 38 165.0

[51] Int. Cl.[6] .................................................... G06F 12/08
[52] U.S. Cl. .................................................. 711/210; 711/3
[58] Field of Search .................................. 711/128, 203, 711/210, 3

[56] References Cited

U.S. PATENT DOCUMENTS

| | | | |
|---|---|---|---|
| 4,332,010 | 5/1982 | Messina et al. | 711/3 |
| 4,727,482 | 2/1988 | Roshon-Larsen et al. | 711/202 |
| 5,003,459 | 3/1991 | Ramanujan | 711/3 |
| 5,119,290 | 6/1992 | Loo et al. | 711/210 |
| 5,361,340 | 11/1994 | Kelly et al. | 711/3 |
| 5,550,995 | 8/1996 | Barrera et al. | 711/3 |
| 5,584,002 | 12/1996 | Emma et al. | 711/3 |
| 5,668,968 | 9/1997 | Wu | 711/3 |
| 5,675,763 | 10/1997 | Mogul | 711/135 |

*Primary Examiner*—Tod R. Swann
*Assistant Examiner*—Kevin Verbrugge
*Attorney, Agent, or Firm*—Akin, Gump, Strauss, Hauer & Feld, L.L.P.

[57] ABSTRACT

The cache (10) is provided with a plurality of cache blocks (12), each having a plurality of cache lines. Each cache block (12) has one synonym entry at most. One cache line of at least one of the cache blocks (12) is selected based on the virtual address. If this cache line points to synonymous entries in other cache blocks, access is had to these, depending on whether a writing or reading operation is signaled to the cache and whether the readability and/or the writability flags for the cache cell entry selected by the virtual address is set or not.

11 Claims, 8 Drawing Sheets

Figure 6:
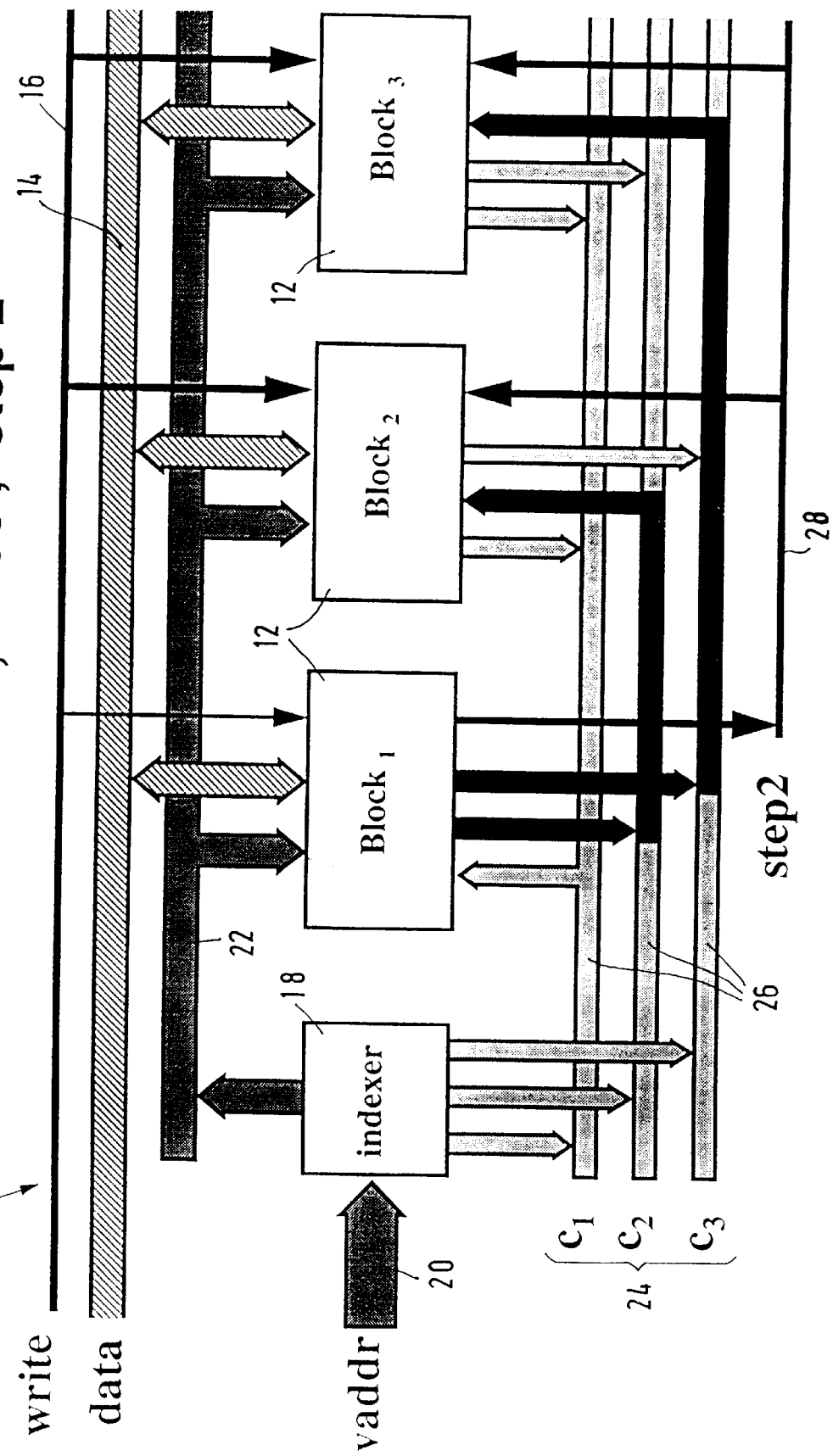

FIG. 6 SF-Cache write, alias, step 2

VIRTUALLY INDEXABLE CACHE MEMORY SUPPORTING SYNONYMS

This application is a U.S. national stage application of PCT/EP94/03667 filed Nov. 8, 1994.

The invention relates to a virtually indexable cache memory that handles synonym entries efficiently without imposing any alignment restrictions thereon.

Advanced processors require cache memories to bridge the gap between fast processors and slow main memories.

Physically and virtually indexable caches are well-known. In the case of the physically indexed cache, the virtual address returned by the processor is first converted by the Translation Lookaside Buffer (TLB) into a real address. Subsequently, the cache is addressed by using this real address. In the case of the virtually indexable cache, the cache is addressed directly by means of the virtual address. A conversion into the corresponding real address is only done upon cache miss. The advantage of a virtually indexable cache is the higher speed since the conversion step done by the TLB is not necessary. Its disadvantage appears with synonyms and/or aliasing. Synonyms are different virtual addresses which are mapped to the same real address. Therefore, with such an aliasing, a (physical) storage object can be addressed by means of different (virtual) addresses. Conventional virtual caches
either forbid synonyms completely,
or restrict their application (e.g. by requiring for two synonyms v and v' always v≡v' (mod cache size)),
or identify aliasing by means of a reverse translation buffer (RTB), however, in this case they need a lot of time for changing between two synonyms.

Figure 8:
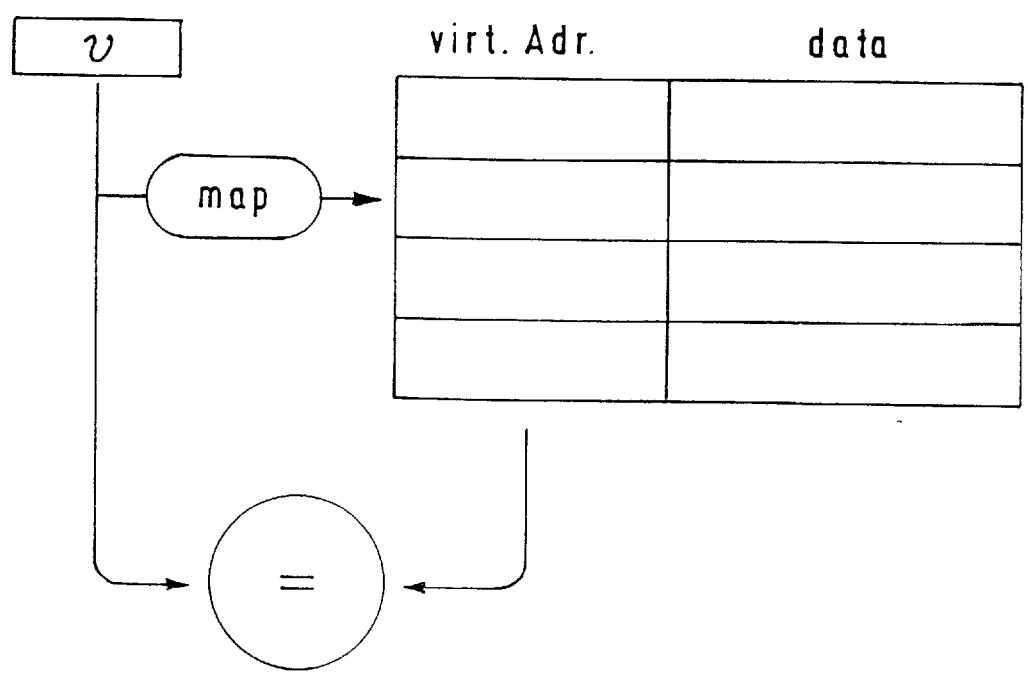

In prior art, so-called direct mapped caches are known. Such a cache is organized as illustrated in FIG. 8. In a direct mapped cache, a cache index is computed from the virtual address v with the aid of a map function, thus selecting a line of the cache. v is then compared with the virtual address of the storage area currently associated with this cache line. There is a hit (cache hit) in the case of equality (and the cache line is used instead of the main memory), otherwise a cache miss is indicated.

In most cases,
(v mod cache size)/line size
is used as a map function. In this case, the complete virtual address need not be stored in the cache, but
v/cache size
is sufficient.

Direct mapped caches are simpler, but lead to higher miss rates than n-way caches do. In general, these consist of n correspondingly smaller direct mapped cache blocks. It is secured that each main memory element is in one block at the most. Since the map function indexes n cache lines each, a maximum of n elements with map-equivalent addresses can be contained in the cache. This e-fold associativity reduces the probability of clashes and increases the hit rate correspondingly.

If a conventional virtually indexable cache allows aliasing in the cache, i.e. it allows several cache lines to be associated with one real object, it usually distinguishes between a main entry and 0 or one or several secondary entries. Access to the main entry is executed normally. Access to a secondary entry leads to an alias miss and makes that
1. the data of the main entry are copied into this secondary entry,
2. this secondary entry becomes the new main entry,
3. the old main entry becomes a secondary entry.

It is the object of the invention to design a virtually indexable cache memory which allows multiple aliasing without alignment restriction and which handles these synonyms efficiently. In particular, the necessary responses to an alias miss should require little time.

To solve the object, the invention provides a virtually indexable cache with the features of claim 1. Alternatively, the present cache may have the features of claim 7. The features of advantageous embodiments of both variants are mentioned in the respective dependent claims.

The virtually indexable cache of the first variant is provided with a plurality of cache blocks for storing information. Via an external data bus, data words are sent from at least one processor to the cache blocks and among the cache blocks. Each cache block can access the data bus and take over data words on this data bus. For virtually addressing the cache, an external data bus is provided on which at least one processor places virtual addresses. The cache has an indexer unit receiving the virtual address and dividing this virtual address into one or a plurality of indexes for one or a plurality of cache blocks and a common remaining address. A remaining address bus to which the indexer unit and the cache blocks are connected is provided for transferring the remaining address from the indexer unit to the cache blocks. The indexes or index are transferred from the indexer unit to the cache blocks via an index bus. This index bus also transfers indexes between the cache blocks, namely the synonym indexes. Here, each index is assigned to a particular cache block. This is true for both the indexes generated by the indexer unit and the synonym indexes stored in the cache blocks, if there are any synonym entries. Via an external write/read line, a write or read signal is applied to each cache block by the at least one processor.

The cache blocks of the present cache according to the first variant are organized such that each cache block has a plurality of cache cells selectable by an index received via the index bus and associated with the respective cache block. Each cache cell in turn comprises a tag field for a tag that is compared to the remaining address should this cache cell be selected by the index. Further, each cache cell has at least one data field for one data word. Per data field, the cache cell has one status field with at least one readability flag and one writability flag. With these flags set, the data word of the data field associated with this status field is readable or writable. When the flags are not set or reset, no direct reading or writing may be done. In a synonym index field, one or a plurality of synonym indexes are stored per cache cell. Valid synonym indexes (one or a plurality, where the fact of the contents of the index field indicating a valid synonym index may be signaled by a corresponding validity bit) stored in this index field indicate those cache cells of the other cache blocks that have data fields associated with the same real address (synonym address) that has been fed to the indexer unit and has led to the cache cell's being indexed in the cache block addressed. Finally, the present cache has a cache hit/miss output by which a cache hit may be indicated if the virtual address received by the indexer unit has a cache cell of one of the cache blocks correctly associated thereto, and by which a cache miss may be indicated if no cache cell in any cache block is associated with the virtual address received by the indexer unit.

Each cache block is provided with a comparator unit for comparing the remaining address received on the remaining address bus, or a part thereof, to the contents of the tag field of a cache cell. The cache cell, the tag of which (contents of the tag field) is compared to the remaining address or a part thereof, is selected by the index of the index bus associated with the respective cache block. This index, in turn, can either be supplied by the indexer unit (in this case, the index is derived from the virtual address received by the indexer unit from the processor) or it may come from the synonym index field of another cache block. A cache miss is indicated at the cache hit/miss output of the cache, if the comparison between the remaining address and the tag of the respective indexed cache cell is negative for all cache blocks.

When writing or reading a data word into or from the cache, the procedure is as follows in a trivial case, where the status field associated to the respective data field has a set writability or readability flag.

When a write signal is on the write/read line, a data word on the data bus may be written directly into the data field of a cache cell indicated by the index of the indexer unit, the data field being determined by the remaining address or a part thereof, if the writability flag of the status field associated the data field is set. When a read signal is on the write/read line, a data word on the data bus may be read directly from the data field of a cache cell indicated by the index of the indexer unit, the data field being determined by the remaining address or a part thereof, if the readability flag of the status field associated the data field is set. Subsequent to the writing or reading, a cache hit is indicated on the cache hit/miss output.

Should the processor signal a write operation, yet the writability flag for the data field of a cache cell indicated by the index of the indexer unit, the data field being determined by the remaining address or a part thereof, is not set, whereby writing into the data field is not allowed, and if the synonym index field holds one or a plurality of valid synonym indexes, the cache of the present invention preferably operates as follows:

Each valid synonym index in the synonym index field of the cache cell indexed by the index of the indexer unit is applied to the respective associated cache block via the index bus.

The data word on the data bus is written into the data field of the cache cell indexed by the index of the indexer unit, regardless of the fact that the writability flag is not set.

The writability and the readability flags of the status field of this data field are set.

Finally, also the writability and readability flags in those status fields are reset that are associated with those data fields in the cache cells indexed by the synonym indexes, which data fields are determined by the remaining address or a part thereof.

Should a read signal be on the write/read line, yet the readability flag in the status field of the data field associated therewith and determined by the remaining address or a part thereof is not set in a cache cell indicated by the index of the indexer unit, the cache of the present invention preferably operates as follows:

Each valid synonym index in the synonym index field of the came cell indexed by the index of the indexer unit is applied to the respective associated cache block via the index bus.

The data word of a data field, determined by the remaining address or a part thereof, of at least one of the cache cells indexed by the synonym indexes is placed onto the data bus, if the readability flag associated with this data field is set. It is to be noted that the data words stored in these data fields are identical. For each data field, determined by the remaining address or a part thereof, of the cache cells indexed by the synonym indexes, the associated writability flag is reset.

Finally, the data word an the data bus is written into the data field, determined by the remaining address or a part thereof, of the cache cell originally indexed by the index form the indexer unit, and the readability flag of the status field associated with this data field is set.

In both cases described above, a cache hit is signaled exactly when all of the steps listed can be executed and have been executed.

The advantage of the present cache is the fast handling of synonym entries. Using an RTB action in the case of synonyms is not required, whereby processing time is saved. Finally, there is no external bus access in the case of a synonym hit, i.e. when synonyms exist; rather, the synonym handling is effected internally and faster.

According to an advantageous embodiment of the invention, the index bus has a plurality of partial index busses. The number of these index busses is equal to the number of cache blocks. Both the indexer unit and all of the cache blocks are connected to each partial index bus. The indexer unit is provided with a plurality of outputs for supplying one index, respectively. Each output is connected with just one partial index bus. The cache blocks have a number of inputs/outputs equal to the number of partial index busses. Here, each cache block has one index input and several index outputs. Each partial index bus is connected to just one index input of one of the cache blocks. The same is true for each output of the cache blocks and the connection thereof with a partial index bus. The advantage of the above described index bus structure is that the partial index busses allow for an association of indexes of the indexer unit and synonym indexes of individual cache blocks with particular came blocks by the hardware.

Alternatively to the above structure of the index bus, the same may also operate in the multiplex mode so that the association of an index with a cache block is timed.

The present cache of the first variant may either be a 1-word cache or a multiple-word cache. Thus, one or a plurality of data fields may be provided per cache cell. Normally, a plurality of such data fields are provided per cache cell, so that the data bus to which all cache blocks are connected does not become too wide.

The object mentioned before is also solved with a cache having the features of claim 7 (second variant). The second variant differs from the first variant of the cache discussed before in that, instead of the writability and readability flag, a multiple flag, indicating whether there are synonym indexes in the synonym index field, is used per cell in each cache block. This information may be indicated by a special multiple flag or it may be stored in a cache cell by at least one of the synonym indexes being valid. Thus, an additional bit for the multiple flag is not ultimately necessary; rather, all validity bits for the synonym indexes could be subjected to a logical OR operation so as to obtain the multiple information.

When the data field or one of the data fields of a cache cell with a set multiple flag is to be written, this data word is also written into all cache cells of other cache blocks indexed by the synonym index(es) of the synonym field of this cache cell. This organization of the cache has the advantage that a synonym can always be read in one step, since upon writing into a data field with synonyms, the synonym data fields are always written, too. As a consequence, the write operation always requires two steps.

The term "bus" as used in connection with the present invention is intended to denote all kinds of transfer networks via which the units connected thereto may communicate. Insofar, the "bus" is merely a special form of a transfer network. Moreover, the term "address" as used in this invention means the name accorded to a real object (e.g. a storage location in a physical memory) or a virtual object (e.g. a storage location in a virtual memory).

The following marginal conditions hold for the present cache in both variants:

When synonym entries are present, these are always located in different cache blocks, each cache block being adapted to hold a maximum of one synonym entry.

Each cache cell indicates the synonym entries in other cache blocks by its valid synonym indexes.

Of all synonym entries one at most has a set writability flag.
Of all synonym entries at least one has a set readability flag.
All synonym entries with a set readability flag are identical.

Figure 1:
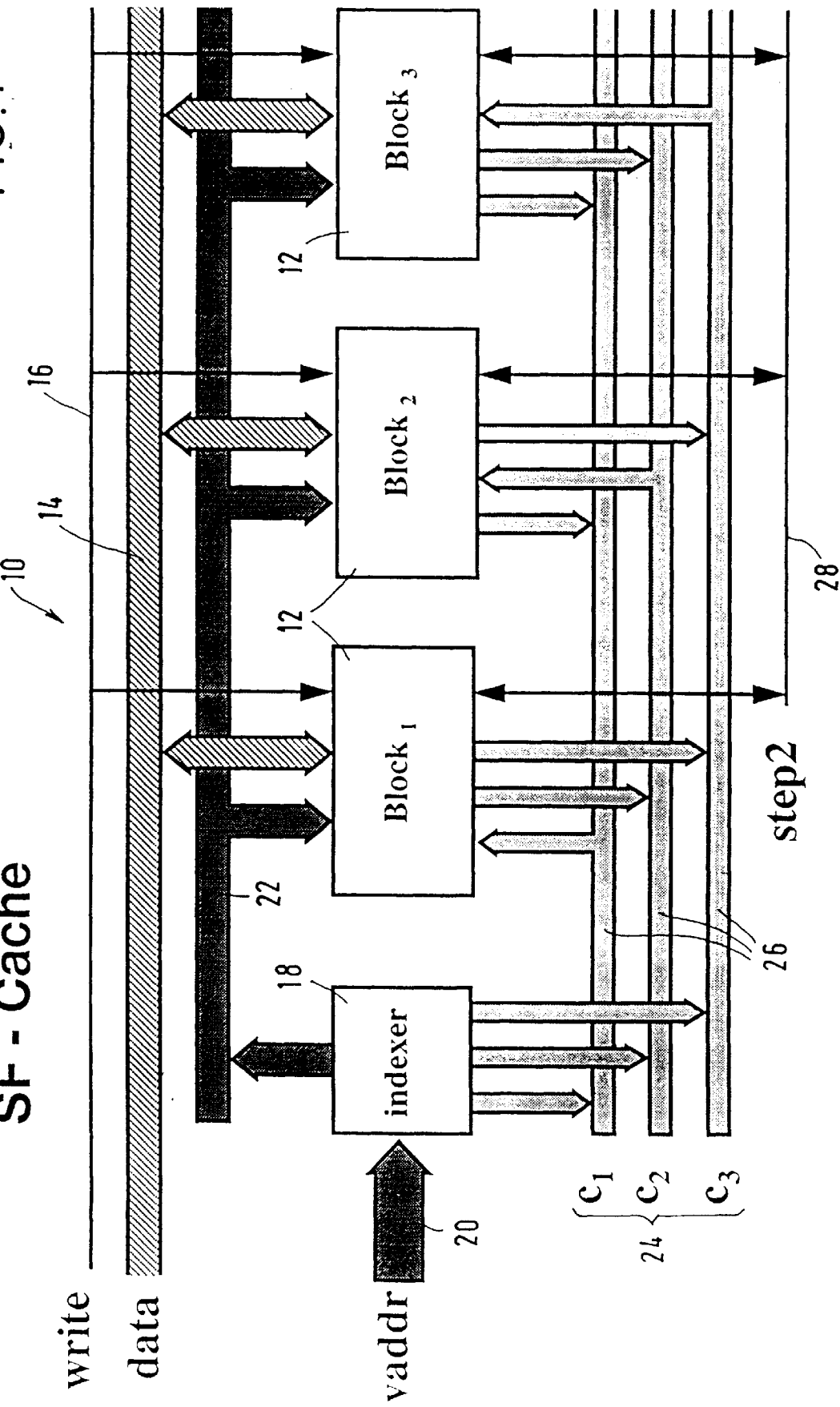
Figure 7:
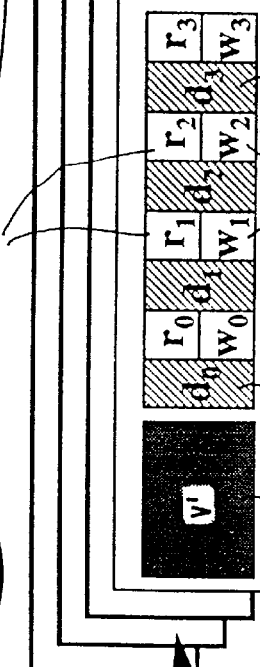

The following is a detailed description of an embodiment of the invention with reference to the drawings. The figures show:

FIG. 1—the basic structure of a cache with internal synonym management,

FIGS. 2 to 6—the cache of FIG. 1, the flow of useful and control data during individual phases of a write and read operation being underlined by emphasizing individual data and control paths;

FIG. 7—a schematic illustration of the structure of a cache block of the cache in FIGS. 1 to 6, and FIG. 8—a schematic illustration of the structure of a conventional cache with map function.

Referring now to FIG. 1, the following is a description of the structure of a cache 10 with efficient synonym handling (hereafter also called SF cache for synonym friendly cache). The cache has a plurality of cache blocks 12 (in the case illustrated, three cache blocks 12 are provided) that are all connected to a bidirectional external data bus 14. The external data bus 14 leads to a processor (not illustrated). This processor is connected to a write/read line 16 connected with each of the cache blocks 12. Besides the cache blocks 12, the cache has an indexer unit 18 to which a virtual address is fed from the processor via an external address bus 20. In the indexer unit 18, a remaining address is generated from the virtual address, which remaining address is placed onto an internal remaining address bus 22. The internal remaining address bus 22 is connected with the cache blocks 12. Besides being connected via the remaining address bus 22, the indexer unit 18 and the cache blocks 12 are further connected via an index bus 24 having a plurality of partial index busses 26. There are as many partial index busses 26 as there are cache blocks 12. The indexer unit 18 and all of the cache blocks 12 are connected with each of the partial index busses 26. Besides the remaining address, an index for each cache is generated from the virtual address in the indexer unit 18. All of these indexes are placed onto the partial index busses 26. These indexes may be different or the same for each cache block 12; in particular, it is also possible that no index is generated for one or a plurality of cache blocks 12. Whereas the indexer unit 18 may place one index on each of the partial index busses 26, respectively, only one cache block 12 is provided per partial index bus 26 to take over the index from this partial index bus 26. On the other hand, this cache block 12 may place indexes onto the other partial index buses 26, which are then meant for other cache blocks. The index placed by one cache block 12 onto one of the partial index busses 26 is a synonym index pointing to synonyms in other cache blocks 12. This will be explained further below. Eventually, all cache blocks 12 are interconnected via an internal control data bus 28. When synonyms are present in the cache 10, a cache block 12 selected by the index generated by the indexer unit 18 places a control signal (hereafter also referred to as step 2 signal) onto the control data bus 28 in the course of a write or read operation, which bus transmits this control signal to the other cache blocks 12. This control signal will also be explained in more detail further below.

Before discussing the function of the cache illustrated in FIG. 1, a short explanation of the internal structure of a cache block 12 will be given now with reference to FIG. 7. Each cache block 12 is comprised of a plurality of cache cells 30 (also referred to as cache lines). Each cache line 30 has a tag field 32 in which a tag v' is stored. In addition to the tag field 32, each cache cell 30 is provided with one or a plurality of data fields 34 (in the embodiment described, there are four data fields 34 per cache cell ) in which data words $d_0$, $d_1$, $d_2$ and $d_3$ may be stored. A status field 36 is associated with each data field 34, each status field having a writability flag 38 and a readability flag 40. If the writability flag 38 is set, a data word may be written into the data field 34 associated with this writability flag 38. If the readability flag 40 is set, a data word may be read from the associated data field 34. When the writability/readability flag 38, 40 is not set, no writing or reading operation is possible. In addition to the tag field 32, the data field(s) 34 and the status field(s) 36, each cache cell 30 has at least one synonym index field 42 (in the embodiment described, there are two synonym index fields 42). These synonym index fields 42 serve to store synonym indexes ($alias_2$, $alias_3$) pointing to cache cells in other cache blocks 12 of the cache 10, in which synonyms are stored. The association of a synonym index stored in a cache cell 30 of a (first) cache block 12 with a cache cell 30 of another (second) cache block 12 is effected by placing the respective synonym index on the partial index bus 26 which the other (second) cache block 12 reads from. Not illustrated in FIG. 7 are validation bits or flags indicating that the synonym index field(s) contain(s) valid synonym indexes.

According to FIG. 7, each cache block 12 is provided with a comparator unit 44. It is the purpose of this comparator unit 44, to compare the remaining address (rem virt address) supplied by the remaining address bus 22 with the tag v' of the tag field 32 of that cache cell 30 that has been selected via the index $c_1$ within the cache block 12. This index $c_1$ is supplied by the indexer unit 18 that generates this index $c_1$ from the virtual address (vaddr, see FIG. 1). When the comparison in the comparator unit 44 is positive, the remaining address is used to select that data field 34 which is to be read or written. The write or read signal is provided to an internal control unit 46 via the line 16. Moreover, the control unit 46 is connected to the control data bus 28 in order to place a control signal thereon that is meant for the other cache blocks or to receive therefrom a control signal generated by another cache block. Finally, the control unit 46 also controls the output of synonym indexes and places the same on the respective partial index buses 26 (depending on the association of the synonym indexes with the individual cache blocks).

Figure 2:
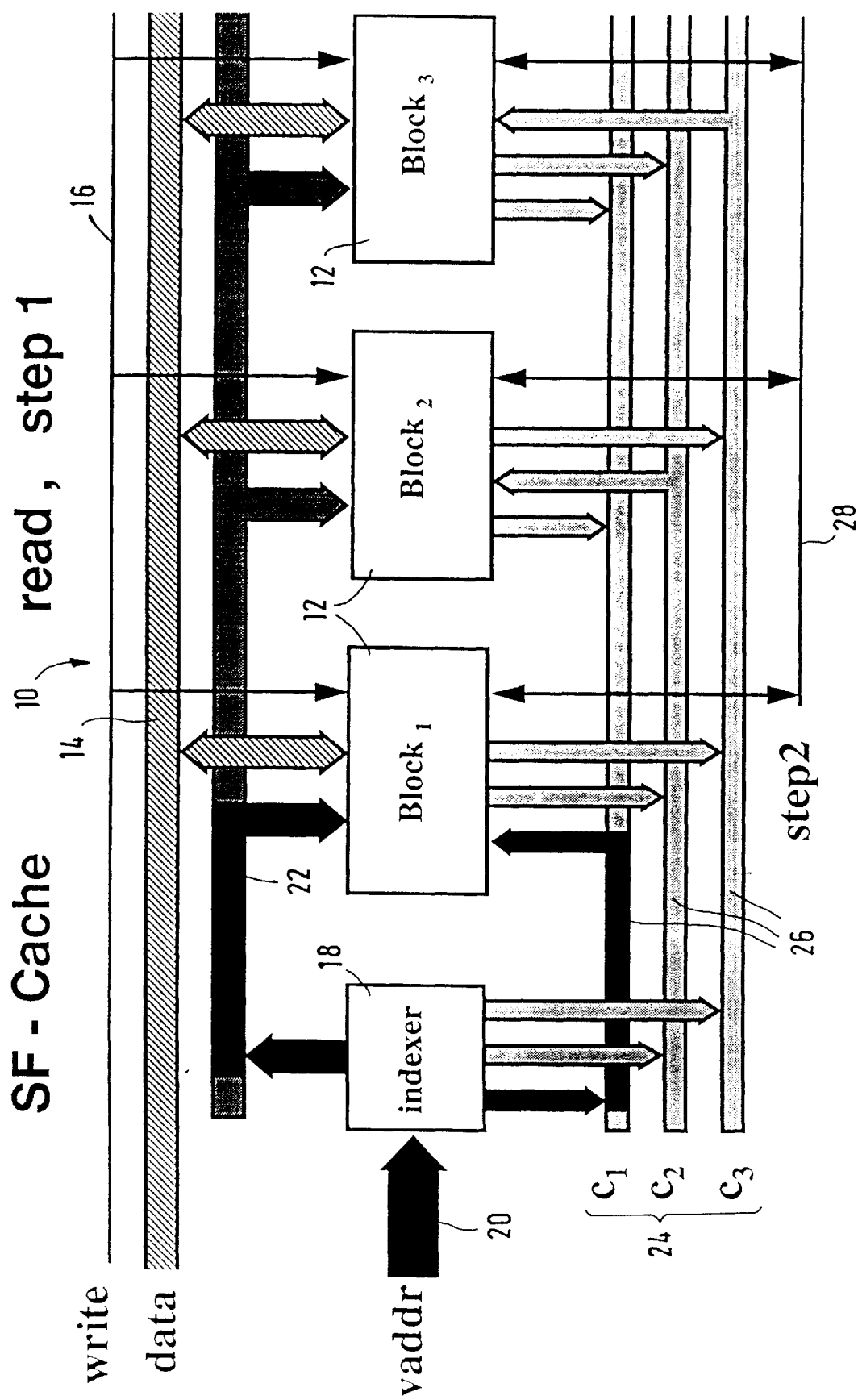
Figure 3:
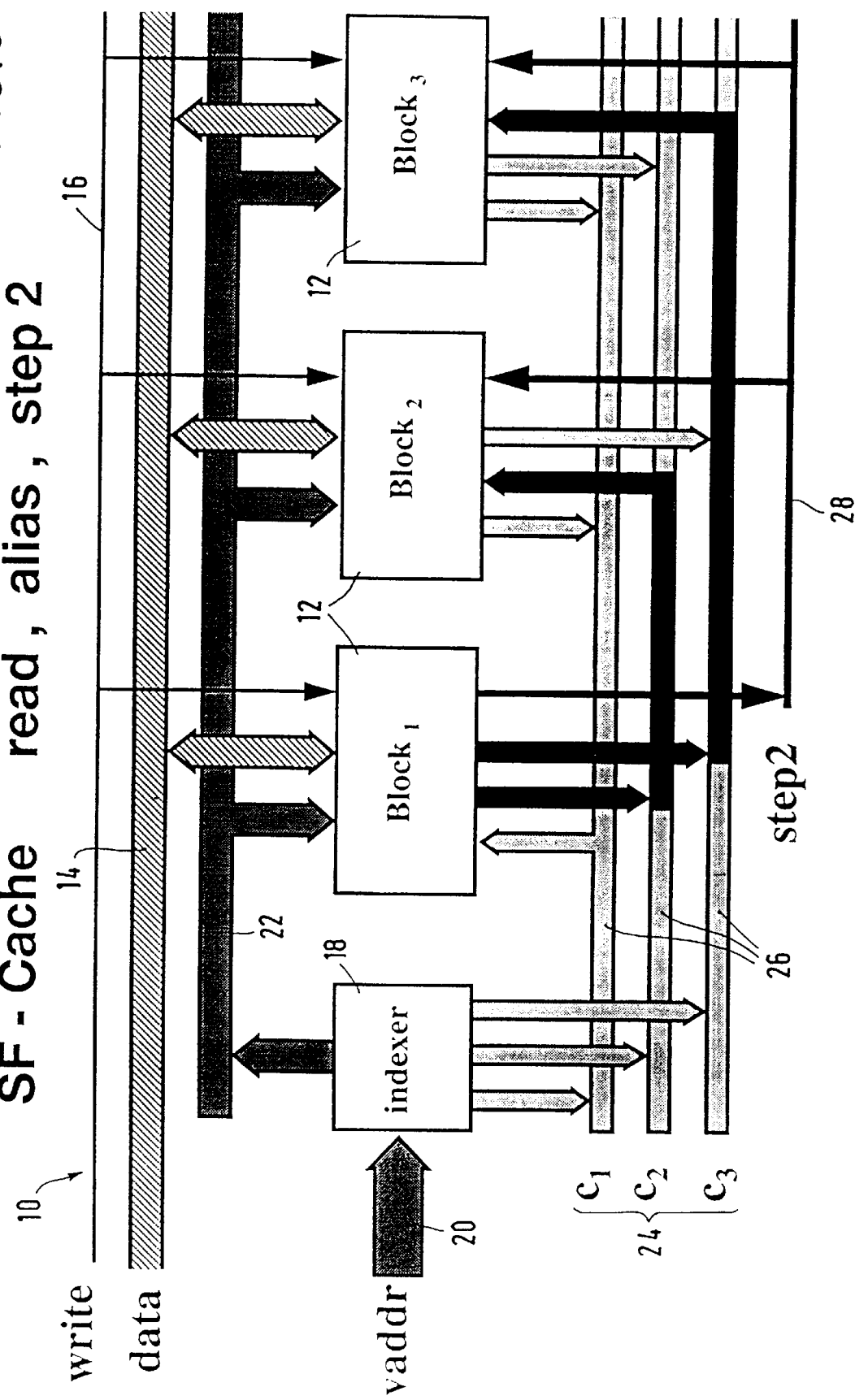
Figure 4:
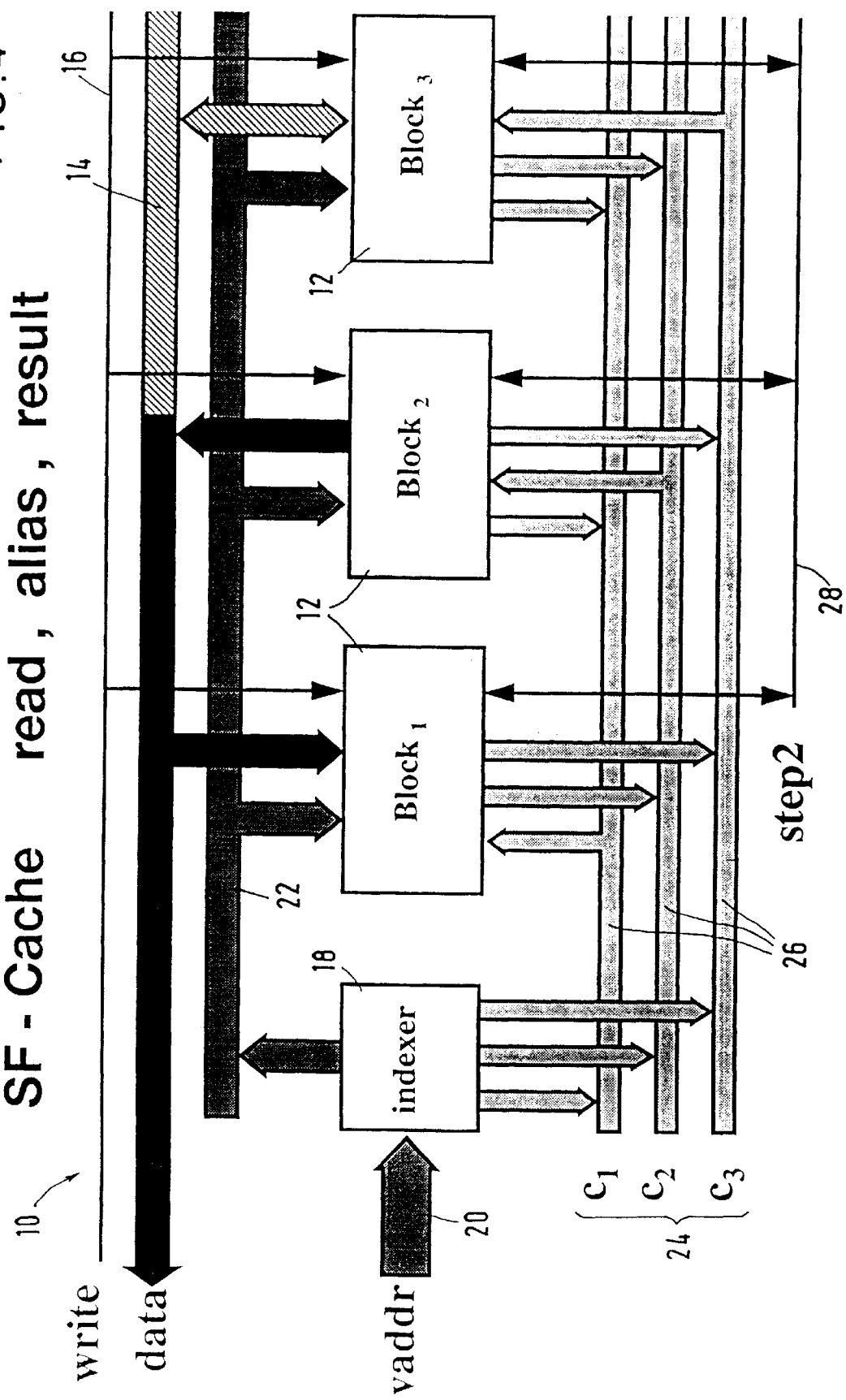
Figure 5:
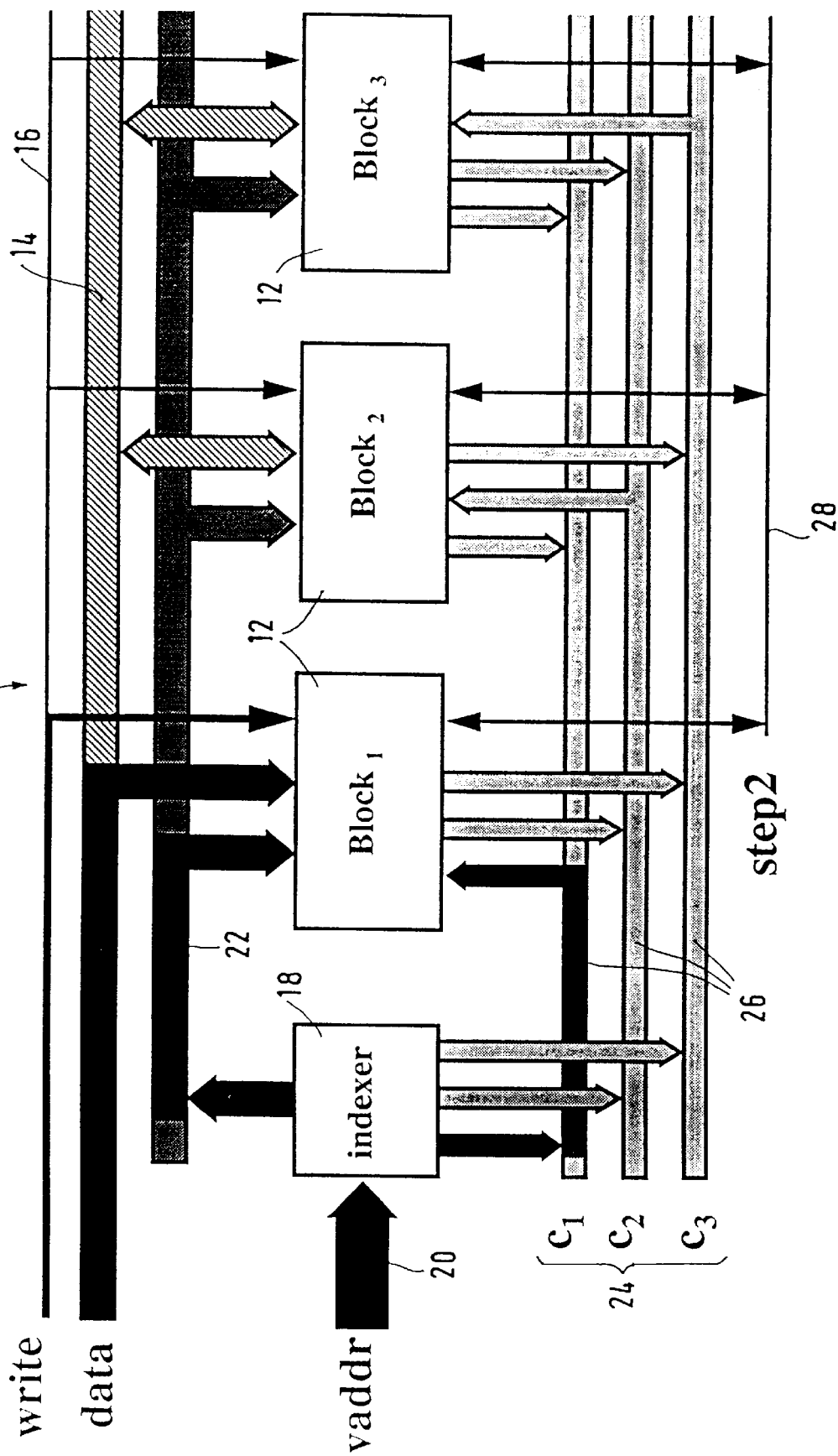

The following is a detailed description of the course of a reading operation with reference to FIGS. 2 to 4 and the course of a writing operation with reference to FIGS. 5 and 6. The cache 10 operates under the marginal condition that, when synonyms are present, these are distributed over a plurality of cache blocks 12, i.e. only one synonym is stored per cache block 12.

In the first phase (step 1) of a reading operation, the processor applies the virtual address (vaddr) via the address bus 20. The indexer unit 18 generates the remaining address that is placed onto the remaining address bus 22. Further, the indexer unit 18 generates one or a plurality of indexes $c_1$ to $c_3$ placed onto the individual partial index buses 26 of the index bus 24. In the case represented in FIG. 2, the index $c_1$ is placed onto the partial index bus 26 from which only the cache block 12 denoted as $block_1$ reads. The index $c_1$ associated with this cache $block_1$ selects a particular cache line within this cache block 12. The tag of the tag field of this cache line is compared to the remaining address. Upon a positive comparison result, the remaining address is also used to select the data field from which to read. For the purposes of the further description it is assumed that the readability flag of the status field associated to this data field is not set and that valid synonym indexes are stored in the synonym index field of the selected cache cell.

Since the readability flag is not set, the data word of the data field may not be read. Since valid synonym indexes are stored in this cache line, they are put on the partial index buses 26. By associating the synonym indexes to the partial index buses 26, the cache block 12 determines which synonym index is provided for which other cache block 12. Then, a cache cell is selected within these other cache blocks 12 using the respective associated synonym indexes. Further, the control unit of the cache block 12 placing the synonym indexes onto the partial index buses 26 generates the control signal (step 2 signal) supplied to the control units of the other cache blocks. This situation is represented in FIG. 3.

One of the cache blocks 12 addressed by the synonym indexes has a cache cell indexed by the respective synonym index, the data field of which, as determined by the remaining address, has a set readability flag, whereby the data word stored in this data field is readable. In the case to be described herein, the cache block concerned is the block$_2$. The data word of the cache cell of this block$_2$ is placed onto the data bus 14 and read by the processor. In addition, this data word is also read by the originally addressed first cache block 12 (block 1 of the Figures). This situation is represented in FIG. 4. Finally, the readability flag, initially not set, for the data field of the indexed cache cell of the block$_1$ is set and the writability flag of the data fields of the cache lines of the other blocks are reset, wherein the data fields are determined by the remaining address and the cache lines are determined by the synonym indexes. Thereafter, the reading operation is terminated and a cache hit is indicated.

In the case that a data word present on the data bus 14 is to be written into a data field of a cache cell within one of the cache blocks, the operation is as illustrated in FIGS. 5 and 6. First, a cache cell of a cache block is selected in the first phase of the writing operation (step 1, s. FIG. 5), as in the case of a reading operation (in the case illustrated in FIG. 5, this is a cache cell of the block$_1$). If it is detected that the writability flag of data field of the cache line specified by the remaining address is not set, the valid synonym indexes of the synonym index fields of this cache lines are placed onto the partial index buses. Thereafter, the data word on the data bus is written into the data field of the block$_1$. The block$_1$ sends a step 2 signal to the remaining cache blocks. The readability and writability flags of those data fields that are contained in the cache cells of the other cache blocks specified by the synonym indexes and determined by the remaining address are all reset, whereas the writability flag and the readability flag of the data field, as determined by the remaining address, of the cache cell indexed by the indexer unit are both set. Then, a cache hit is signaled.

a 1-bit field readable (readability flag),
a 1-bit field writable (writability flag),
n—1 fields alias$^{(j)}$ for j≠i). (synonym index fields).

The fields alias$_{ci}^{(j)}$ either contain the special value no address or the cache address of the line of block j which contains a synonym of the current line.

The following invariances hold:
1. Synonyms are always in different cache blocks.
2. Each cache line "knows" where all its synonyms contained in the cache are.
3. A maximum of one cache entry of all synonymous cache entries is writable.
4. A minimum of one cache entry of all synonymous cache entries is readable.
5. All readable synonymous cache entries are of identical data value.

Each cache block is a unit operating independently. The following describes the response of block i as a function of its input signals. Left to →, we list the prerequisites for the operations described on the right. For selecting an alternative, all prerequisites-listed in its context should be fulfilled (AND-operation). All operations separated by comma are done in parallel; the clock pulse end is indicated by □. For two clock pulse alternatives, the second step is executed independently of the control signals set at this time. Overline (such as $\overline{step2}$) denotes the negation of a signal and/or a bit, $\overline{step2!}$ denotes the setting and step2! the resetting of a signal and/or a bit. D denotes the data bus, V the virtual address coming from the processor and V' the cache-internal virtual address bus on which the indexer sets the remaining virtual address required by the cache blocks for hit checking.

The hit signal (not shown in the block diagram) signals the successful termination of a read or write operation to the processor. Unless either hit or step2 are set at the end of a clock pulse, a miss is signaled to the processor.

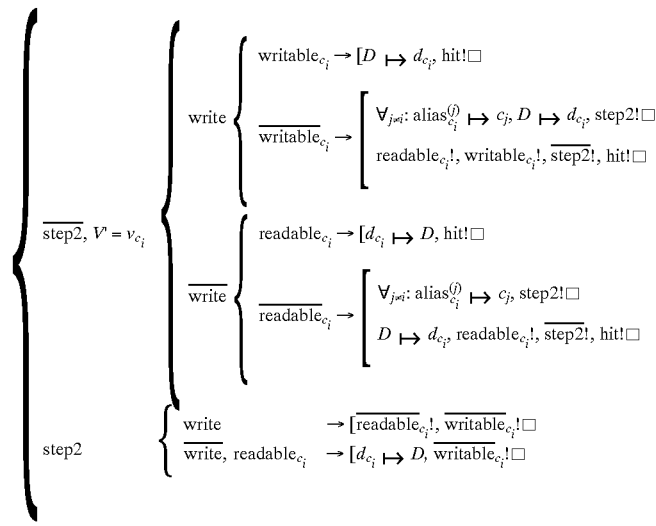

Whereas the Figures, in particular FIG. 7, and the above description refer to a multi-word cache, yet the following is another explanation of the characteristic features of the function of the present SF-cache, using a one-word cache with a data bus wide enough to carry an entire cache entry in one step (i.e. each line has only one data field).

For the SF cache, each cache line (in addition to various control information) contains not only the associated virtual address $v_{ci}$, and the data $d_{ci}$, but also If a cache line contains k words (with respect to the data bus), or, in other words, k data fields, the readable and writable bits are recorded per word. The corresponding word is selected via the low-value part v of the set virtual address V. The response of cache block i is then as follows:

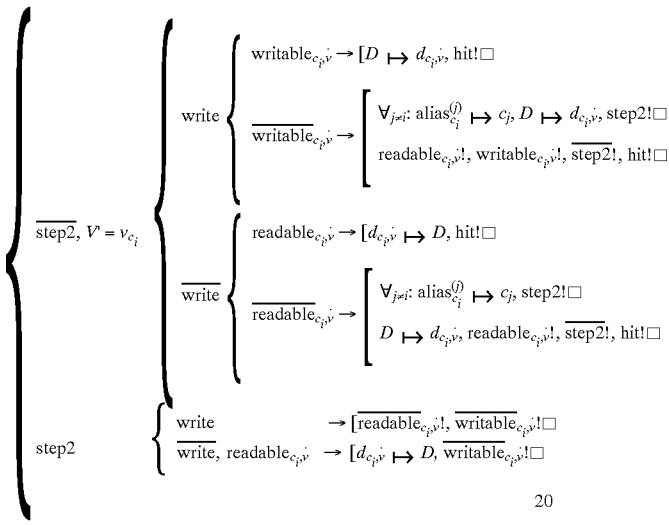

It is to be noted that the currently valid words of a cache object may now be distributed over several blocks. The invariances listed above now apply word for word.

Independently of the SF property, the indexer can address various lines of the individual blocks even in the first step in order to avoid clashes. Depending on the used map function, the address bus V' should then be extended.

In the case of a simplified SF cache, we do without the field readable and we use a field shared instead of the field writable. Cache block i then operates as follows (the following describes the multi-word version):

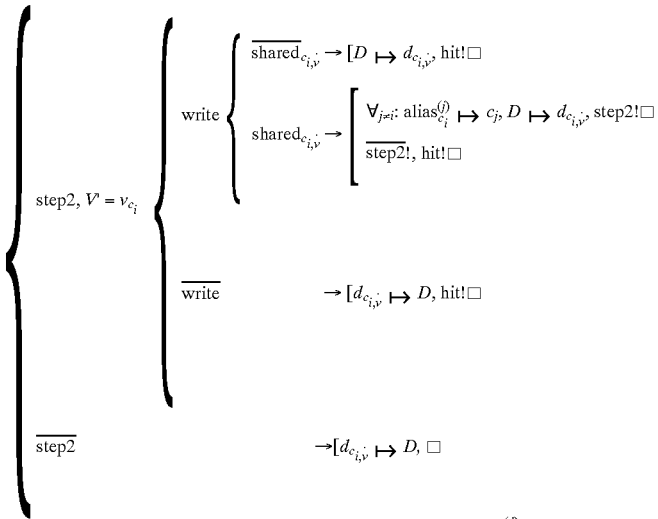

It holds: shared is set precisely if at least one $alias_{c_i}^{(j)}$ contains a real address. Therefore, a circuit can also be used instead of the shared field in the cache, namely a circuit which forms the following ($\emptyset$ denotes the value no address):

$\overline{\forall_{i \neq j}:alias_{ci}^{(j)} = \emptyset}$

It is to be noted that writing always takes two steps if a synonym is in the memory, but that reading can always be handled in one step.

I claim:

1. A virtually indexable cache comprising
a plurality of cache blocks for storing information,
an external data bus for transmitting data words between the cache blocks and for transmitting data words from said cache blocks to at least one processor and vice versa,
an external address bus for transmitting virtual addresses from at least one processor,
an indexer unit connected with said external address bus, for generating from a virtual address received from said at least one processor an index for each cache block and a common remaining address for all cache blocks,
an internal remaining address bus for transmitting said remaining address, to which said indexer unit and the cache blocks are connected,
an index bus for transmitting the indexes associated to the cache blocks from said indexer unit to said cache blocks and among said cache blocks,
an external write/read line for transmitting a write or read signal from at least one processor to each cache block,
wherein each cache block comprises:
a plurality of cache cells selectable by an index received via said index bus and associated to the respective cache block, each cache cell comprising at least:
a tag field for a tag,
at least one data field for a data word,
for each data field, a status field with at least one readability flag and one writability flag, and
at least one synonym index field for a synonym index pointing to a cache cell of another cache block, this cache cell being associated with a virtual address synonymous to the virtual address received by said indexer unit, and a cache hit/miss output for signaling a cache hit when the virtual address received by said indexer unit is allowably associated with a cache cell in one of the cache blocks, and for signaling a cache miss when no cache cell in any of the cache blocks is associated with the virtual address received by said indexer means.

2. The cache of claim 1, characterized in that each cache block comprises a comparator unit for comparing the remaining address or a part thereof received via the remaining address bus to the contents of the tag field of a cache cell selected by an index received via said index bus and associated to the respective cache block, and that a cache miss is signaled at the cache hit/miss output if the result of the comparison of the remaining address and the tag of the respective tag field is negative for all cache blocks.

3. The cache of claim 1, characterized in that when a write signal is present on the write/read line, a data word on the data bus may be written directly into a data field, determined by the remaining address or a part thereof, of a cache cell indexed by the index from said indexer unit, if the writability flag of the status field associated to this data field is set, and that when a read signal is present on the write/read line, the data word of a data field, determined by the remaining address or a part thereof, of a cache cell indexed by the index from said indexer unit, may be read directly, if the readability flag of the status field associated to this data field is set, a cache hit being signaled at the cache hit/miss output subsequent to the writing or reading.

4. The cache of claim 1 characterized in that with a write signal on the external write/read line and a not-set writability flag in the status field of the data field, associated therewith and determined by the remaining address or a part thereof, of a cache cell indexed by the index from said indexer unit, each valid synonym index in the synonym field of the cache cell indexed by the index from the indexer unit is applied to the respective associated cache block via the index bus, the data word on the data bus is written into a data field, determined by the remaining address or a part thereof, of the cache cell originally indexed by the index from said indexer unit, the writability flag and the readability flag of the status field of the data field, determined by the remaining address or a part thereof, of the cache cell originally indexed by the index from said indexer unit are set, and for all data fields, determined by the remaining address or a part thereof, of those cache cells of other blocks indexed by the valid synonym indexes, the writability and readability flags of the respective associated status field are reset.

5. The cache of claim 1, characterized in that with a read signal on the write/read line and a not-set readability flag in the status field of the data field, associated therewith and determined by the remaining address or a part thereof, of a cache cell indexed by the index from said indexer unit, each valid synonym index in the synonym field of the cache cell indexed by the index from the indexer unit is applied to the respective associated cache block via the index bus, the data word of all data fields, determined by the remaining address or a part thereof, of those cache cells of other blocks indexed by the valid synonym indexes, is placed on the data bus, if the readability flags associated with these data fields are set, and that for each data field, determined by the remaining address or a part thereof, of the cache cells indexed by the synonym indexes, the writability flag of the associated status field is reset, and the data word on the data bus is written into the data field, determined by the remaining address or a part thereof, of the cache cells indexed by the index from the indexer unit and the readability flag of the status field associated with this data field is set.

6. The cache of claim 1, characterized in that said index bus has a number of partial index buses which is equal to the number of cache blocks, each partial index bus being connected to said indexer unit and all cache blocks, and that it is true for each partial index bus that an index may be placed onto the partial index bus by the indexer unit and a synonym index may be placed thereon by one of said cache blocks and that an index on said partial index bus may be taken over by all of the other cache blocks.

7. A virtually indexable cache comprising a plurality of cache blocks for storing information, an external data bus for transmitting data words between the cache blocks and for transmitting data words from said cache blocks to at least one processor and vice versa, an external address bus for transmitting virtual addresses from at least one processor, an indexer unit connected with said external address bus for generating from a virtual address received from said at least one processor an index for each cache block and a common remaining address for all cache blocks, an internal remaining address bus for transmitting said remaining address, to which said indexer unit and the cache blocks are connected, an index bus for transmitting the indexes associated to the cache blocks from said indexer unit to said cache blocks and among said cache blocks, an external write/read line for transmitting a write or read signal from at least one processor to each cache block, wherein each cache block comprises:

a plurality of cache cells selectable by an index received via said index bus and associated to the respective cache block, each cache cell comprising at least:

a tag field for a tag, at least one data field for a data word, at least one synonym index field for a synonym index pointing to a cache cell of another cache block, this cache cell being associated with a virtual address synonymous to the virtual address received by said indexer unit, a multiple indication indicating whether a valid synonym index is present in at least one synonym index field or not, and a cache hit/miss output for signaling a cache hit when the virtual address received by said indexer unit is allowably associated with a cache cell in one of the cache blocks, and for signaling a cache miss when no cache cell in any of the cache blocks is associated with the virtual address received by said indexer means.

8. The cache of claim 7, characterized in that each cache block comprises a comparator unit for comparing the remaining address or a part thereof received via the remaining address bus to the contents of the tag field of a cache cell selected by an index received via said index bus and associated to the respective cache block, and that a cache miss is signaled at the cache hit/miss output if the result of the comparison of the remaining address and the tag of the respective tag field is negative for all cache blocks.

9. The cache of claim 7, characterized in that when a write signal is present on the write/read line, a data word on the data bus may be written directly into a data field, determined by the remaining address or a part thereof, of a cache cell indexed by the index from said indexer unit, if the multiple indication indicates that no valid synonym index exists in the at least one synonym index field, and that when a read signal is present on the write/read line, the data word of a data field, determined by the remaining address or a part thereof, of a cache cell indexed by the index from said indexer unit, may be read directly.

10. The cache of claim 7, characterized in that with a write signal on the external write/read line and a set multiple flag for the cache cell indexed by the index from said indexer unit, each valid synonym index in the synonym field of the cache cell indexed by the index from the indexer unit is applied to the respective associated cache block via the index bus, and the data word on the data bus is written into all of the data fields, determined by the remaining address or a part thereof, of the cache cells indexed by the index from said indexer unit and by their synonym indexes.

11. The cache of claim 7, characterized in that said index bus has a number of partial index buses which is equal to the number of cache blocks, each partial index bus being connected to said indexer unit and all cache blocks, and that it is true for each partial index bus that an index may be placed onto the partial index bus by the indexer unit and a synonym index may be placed thereon by one of said cache blocks and that an index on said partial index bus may be taken over by all of the other cache blocks.

* * * * *

UNITED STATES PATENT AND TRADEMARK OFFICE
CERTIFICATE OF CORRECTION

PATENT NO. : 5,813,046
DATED : September 22, 1998
INVENTOR(S) : Jochen Liedtke

It is certified that error appears in the above-identified patent and that said Letters Patent is hereby corrected as shown below:

On the title page, area [22] PCT Filed:, change "Aug. 11, 1994" to --Nov. 8, 1994--.

Signed and Sealed this

Thirtieth Day of March, 1999

Attest:

Attesting Officer

Q. TODD DICKINSON

Acting Commissioner of Patents and Trademarks